United States Patent [19]

Beaulieu et al.

[11] Patent Number: 5,768,845
[45] Date of Patent: Jun. 23, 1998

[54] MODULE PANEL AND ASSEMBLY

[75] Inventors: Bryan J. Beaulieu; Igor Slutsky, both of Burnsville, Minn.

[73] Assignee: Skyline Displays, Inc., Burnsville, Minn.

[21] Appl. No.: 725,725

[22] Filed: Oct. 4, 1996

[51] Int. Cl.⁶ ...................................................... E04B 2/74
[52] U.S. Cl. ......................... 52/585.1; 52/36.1; 52/127.8; 52/475.1; 52/656.9; 52/787.1; 52/793.1; 52/801.1; 52/239; 403/188; 403/217; 403/406.1
[58] Field of Search ............................... 52/585.1, 475.1, 52/656.9, 127.8, 36.1, 787.1, 793.1, 801.1, 239; 403/188, 217, 406.1

[56] References Cited

U.S. PATENT DOCUMENTS

| | | | |
|---|---|---|---|
| 3,304,108 | 2/1967 | Hamilton et al. | 52/656.9 X |
| 3,425,726 | 2/1969 | Muller . | |
| 3,561,801 | 2/1971 | Chiu et al. | 52/656.9 |
| 3,695,655 | 10/1972 | Wippermann . | |
| 3,837,754 | 9/1974 | Malcik . | |
| 3,884,002 | 5/1975 | Logie | 52/585.1 X |
| 4,067,165 | 1/1978 | Timmons | 52/585.1 |
| 4,299,067 | 11/1981 | Bertschi | 52/585.1 X |
| 4,514,107 | 4/1985 | Moreno . | |
| 4,627,210 | 12/1986 | Beaulieu . | |
| 4,658,560 | 4/1987 | Beaulieu . | |
| 4,726,701 | 2/1988 | Thomas . | |
| 4,727,994 | 3/1988 | Beaulieu . | |
| 4,896,992 | 1/1990 | Muhlethaler . | |
| 4,919,259 | 4/1990 | Beaulieu . | |
| 4,926,294 | 5/1990 | Beaulieu et al. . | |
| 4,934,858 | 6/1990 | Beaulieu . | |
| 4,941,717 | 7/1990 | Beaulieu . | |
| 4,942,713 | 7/1990 | Jackson . | |
| 4,945,706 | 8/1990 | Beaulieu . | |
| 4,991,813 | 2/1991 | Beaulieu . | |
| 5,048,995 | 9/1991 | Beaulieu . | |
| 5,058,359 | 10/1991 | Lindblom . | |
| 5,076,736 | 12/1991 | Grewe et al. . | |
| 5,078,284 | 1/1992 | Pirkl et al. . | |
| 5,092,385 | 3/1992 | Beaulieu . | |
| 5,105,594 | 4/1992 | Kirchner . | |
| 5,115,855 | 5/1992 | Lindblom et al. . | |
| 5,125,193 | 6/1992 | Beaulieu . | |
| 5,148,648 | 9/1992 | Sorenson et al. . | |
| 5,195,839 | 3/1993 | Wicklund et al. . | |
| 5,203,126 | 4/1993 | Sorenson et al. . | |
| 5,203,134 | 4/1993 | Sorenson et al. . | |
| 5,220,952 | 6/1993 | Beaulieu . | |
| 5,308,448 | 5/1994 | Beaulieu . | |
| 5,317,469 | 5/1994 | Beaulieu . | |
| 5,327,700 | 7/1994 | Sorenson et al. . | |
| 5,333,322 | 8/1994 | Lindblom et al. . | |
| 5,335,593 | 8/1994 | Stoddard et al. . | |
| 5,340,533 | 8/1994 | Beaulieu et al. . | |
| 5,343,420 | 8/1994 | Sorenson et al. . | |
| 5,349,608 | 9/1994 | Savoie . | |
| 5,363,625 | 11/1994 | Philippi . | |
| 5,371,988 | 12/1994 | Hannes | 52/656.9 X |
| 5,483,778 | 1/1996 | Scrivener . | |
| 5,494,370 | 2/1996 | Habicht et al. . | |
| 5,509,502 | 4/1996 | Beaulieu . | |

*Primary Examiner*—Christopher Kent
*Attorney, Agent, or Firm*—Larkin, Hoffman, Daly & Lindgren, Ltd.

[57] ABSTRACT

A module panel for use in constructing different configurations of module assemblies. The module panel has an outer frame and a central core. The frame has outer shell and hollow interior. The frame has a plurality of frame members connected by frame connection member and a plurality of connector holes for inserting connection members for like connecting panels to construct a module assembly.

Connection members are anchored to the frame via connector fastener members which have a connector cavity. The connector fastener members are inserted into the frame through an opening and moved within the frame to align the connector cavity with a desired connection hole for insertion of a connector member. The connector member is secured relative to the frame within the connector cavity for connecting module panels. Connector members may also be received within the frame connection members at the corners of two adjoining frame members.

22 Claims, 9 Drawing Sheets

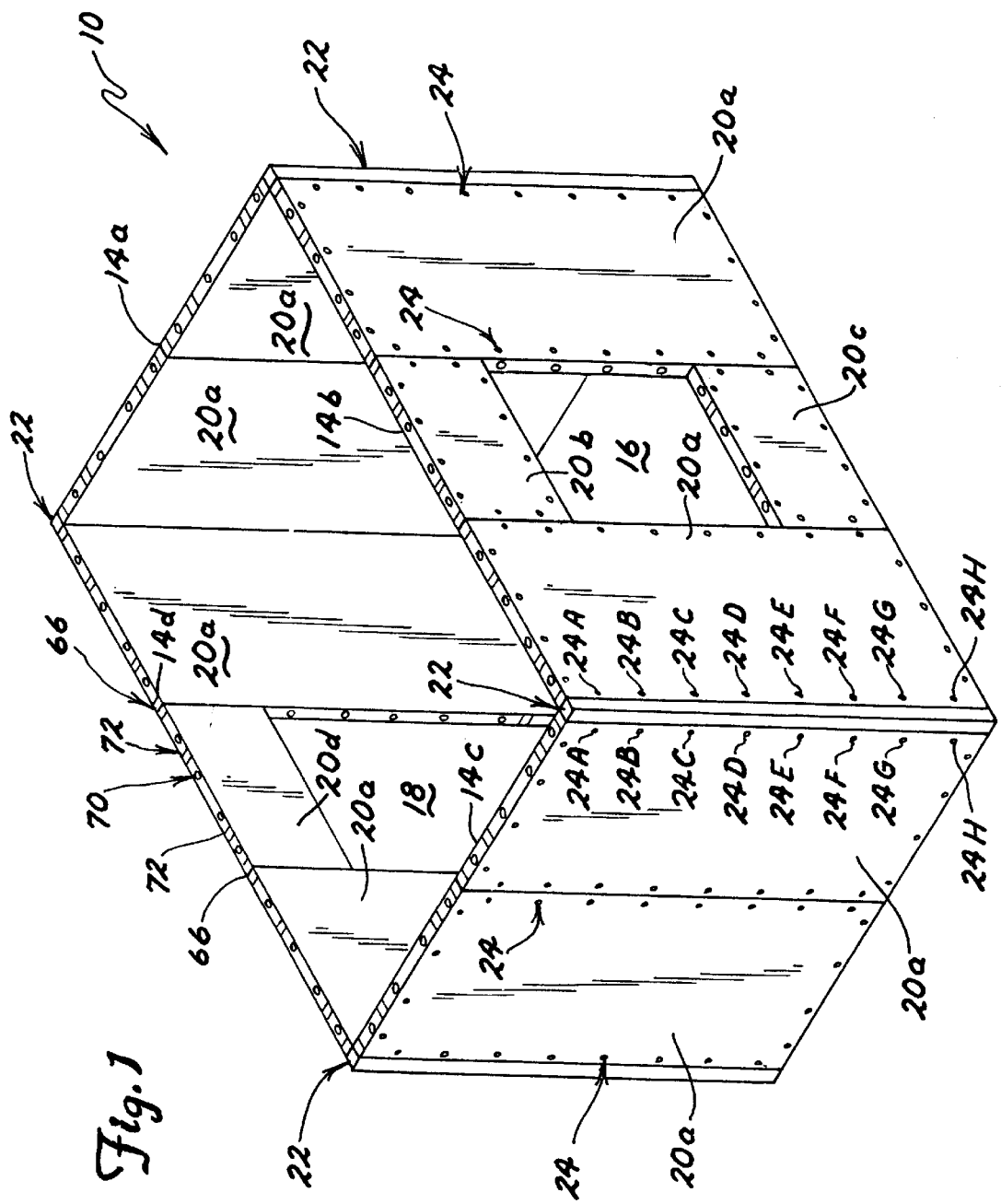

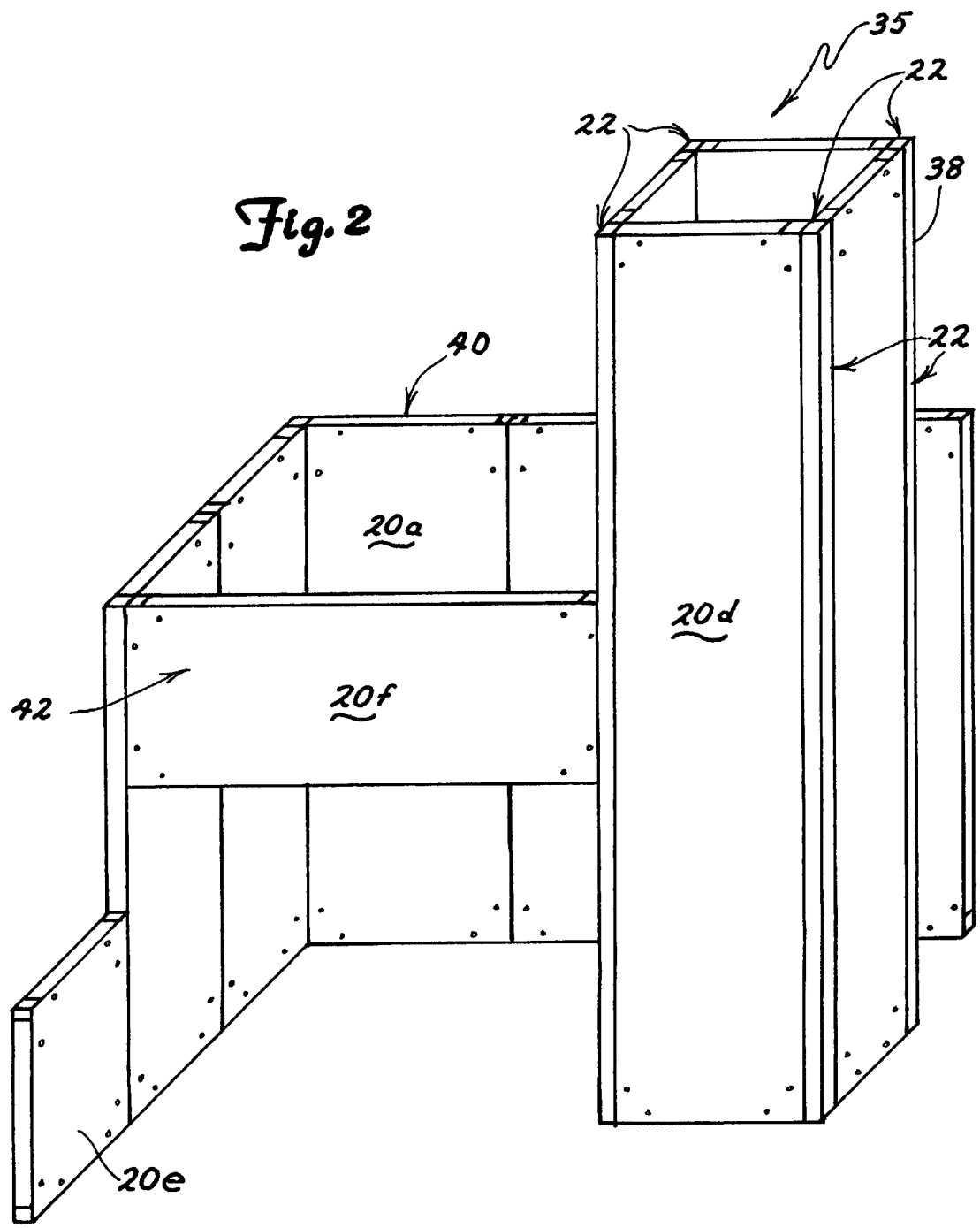

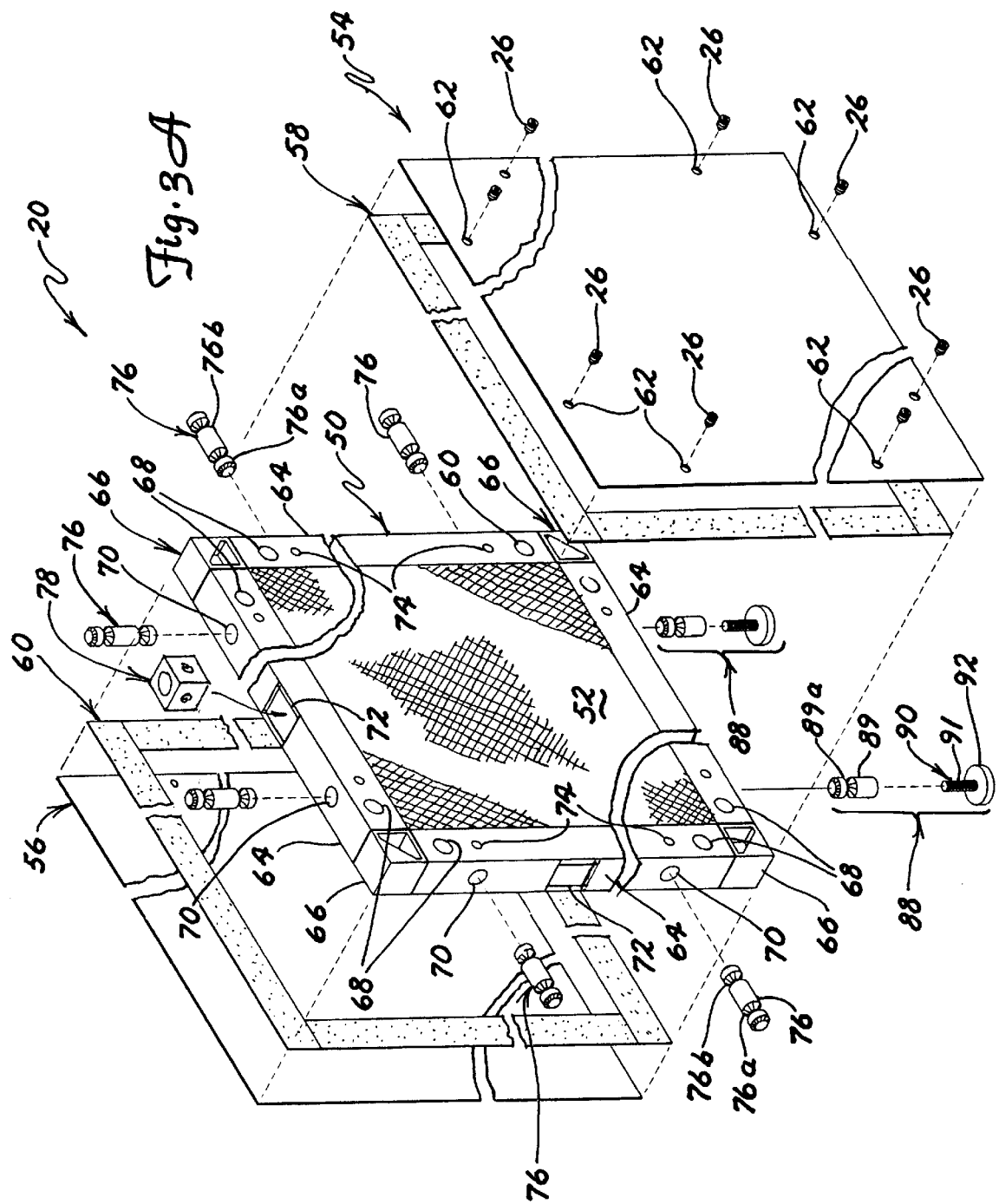

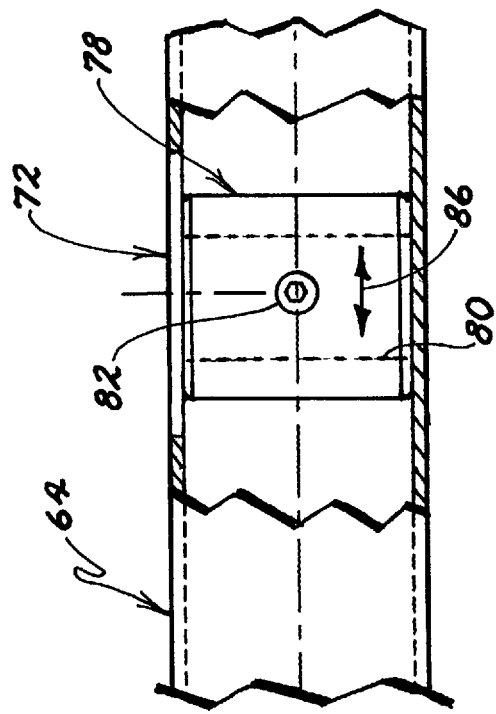
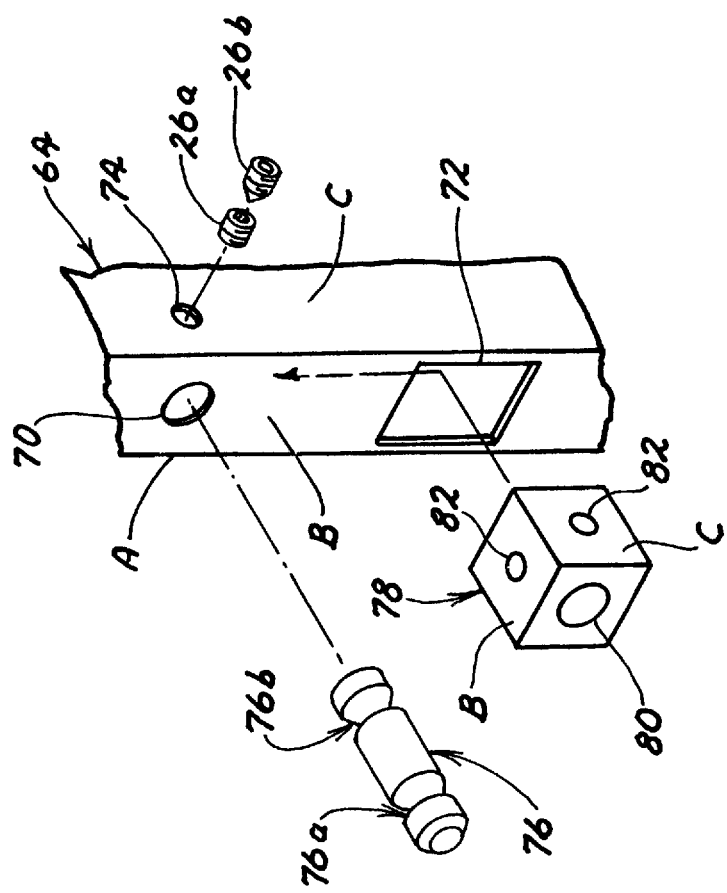

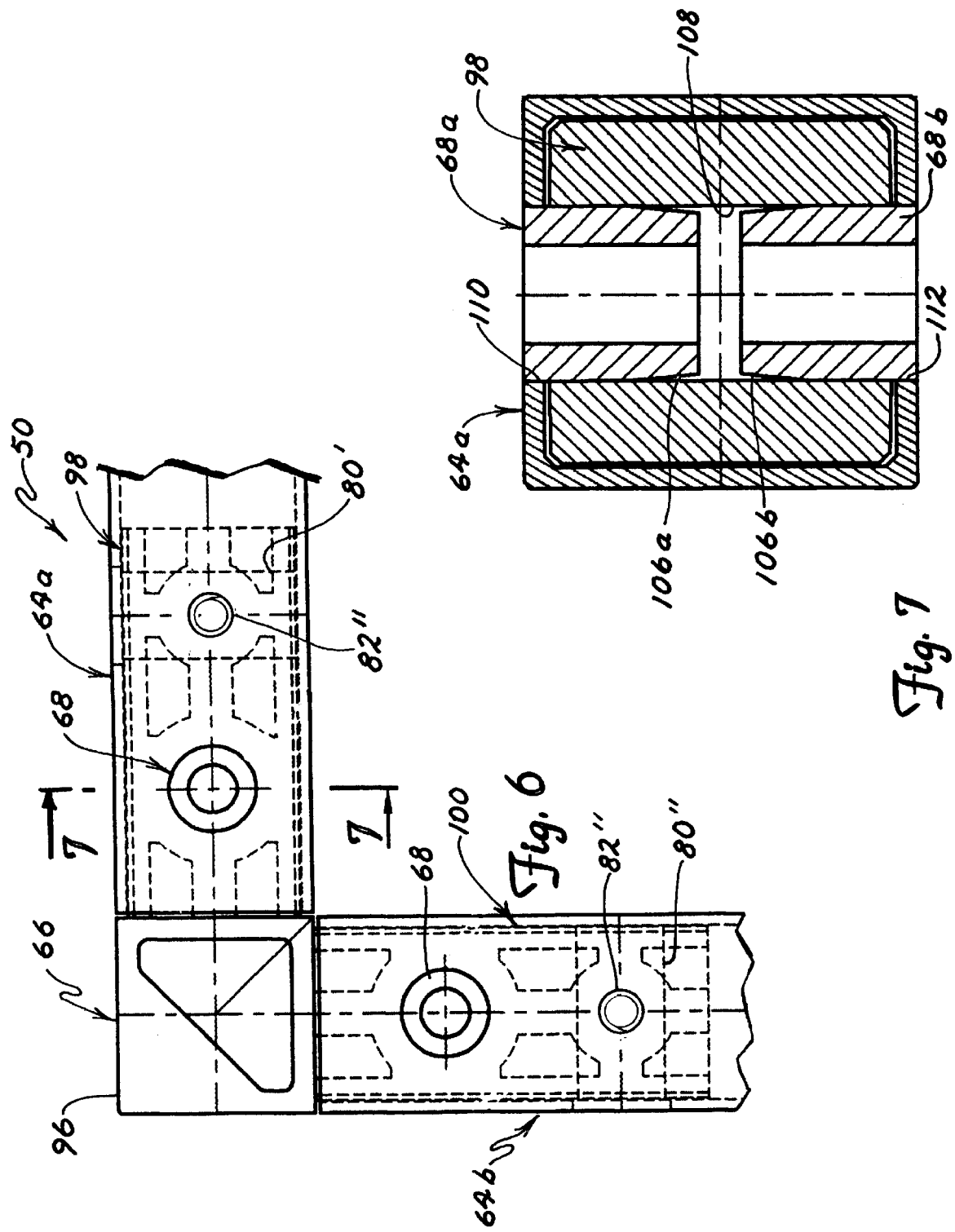

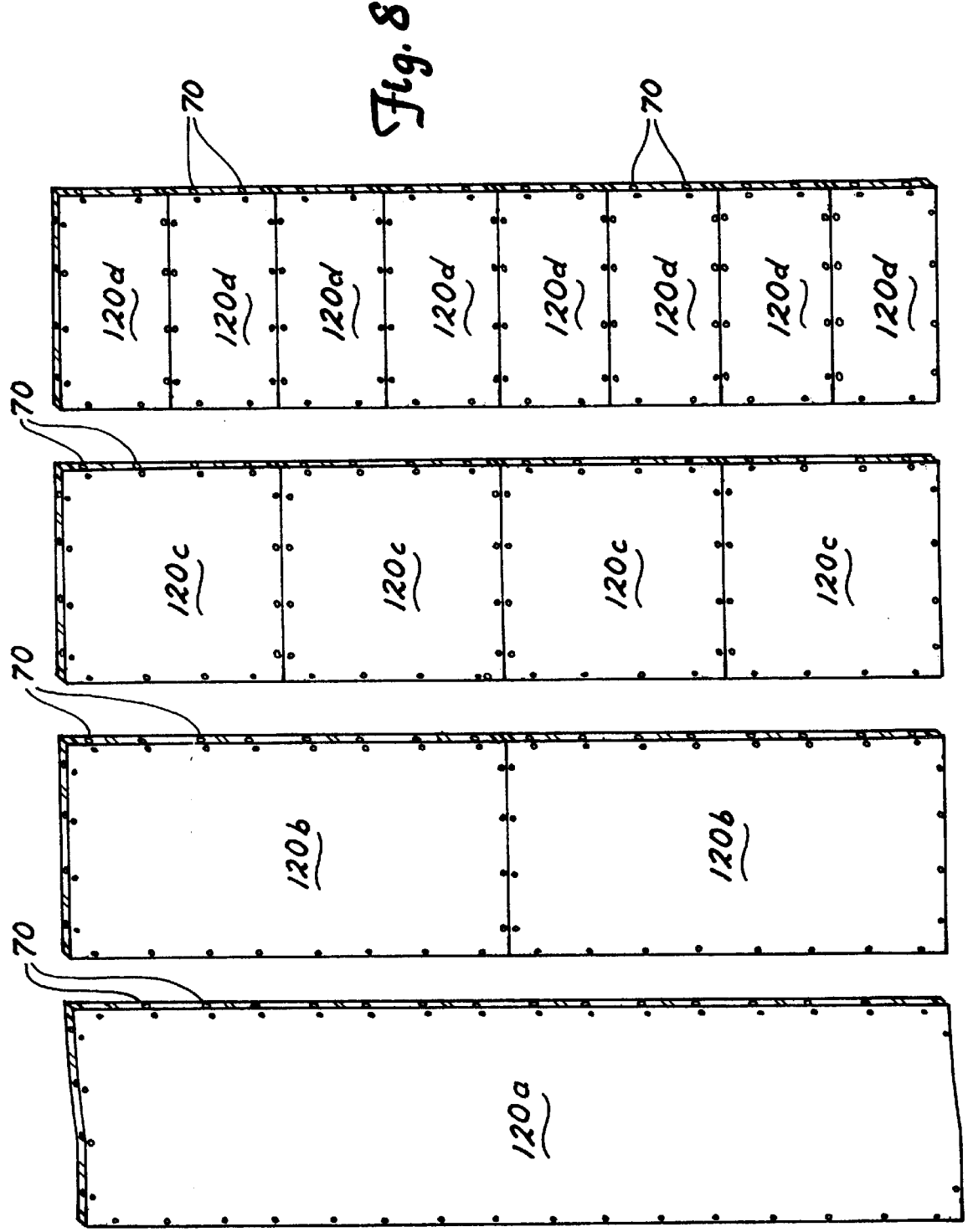

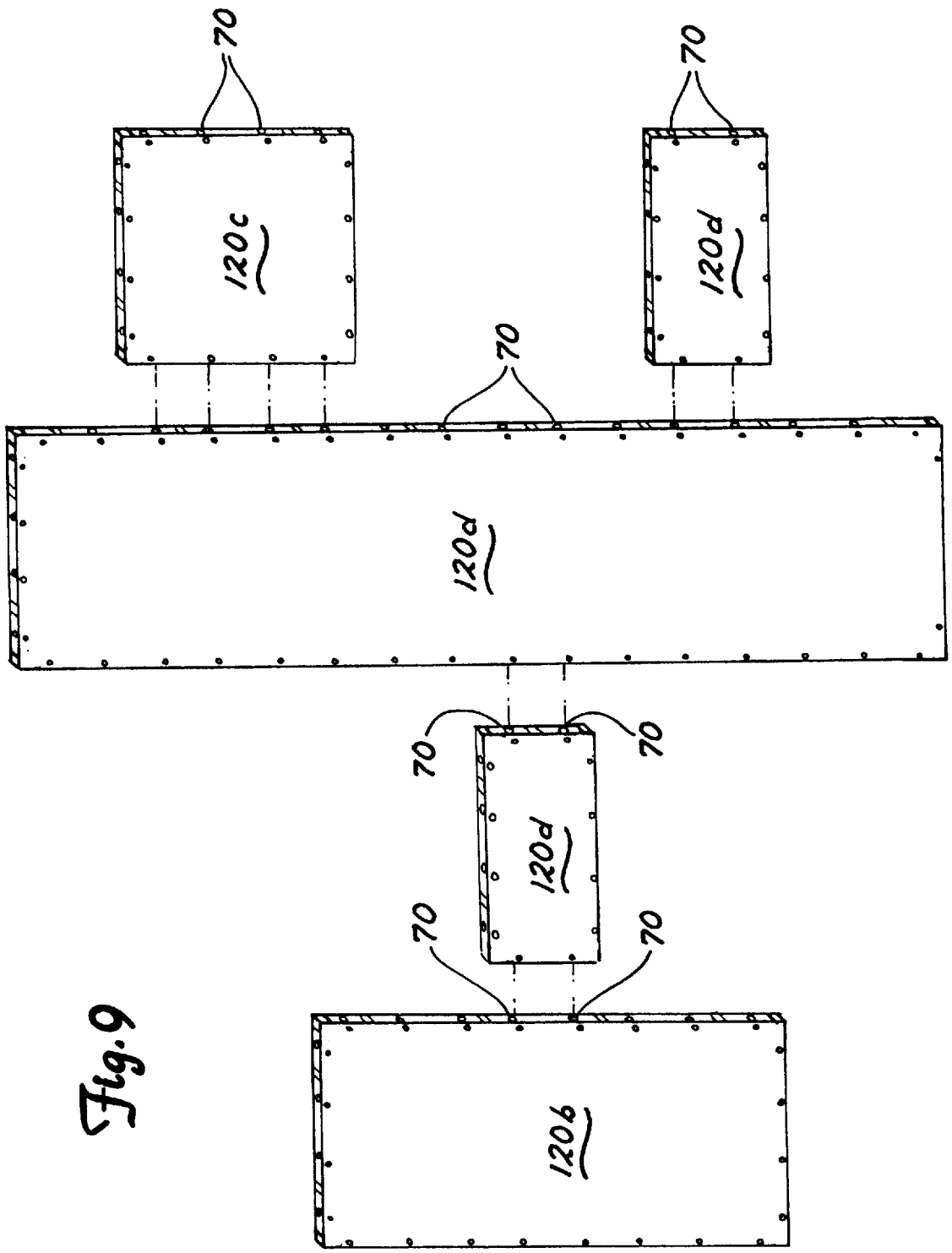

MODULE PANEL AND ASSEMBLY

BACKGROUND OF INVENTION

The present invention relates to an improved panel construction for use in constructing module assemblies. In particular, the present invention relates to a detachable panel construction for connecting a plurality of panels to form a module assembly.

Module panels are used for constructing module assemblies, and are formed of a generally rigid construction. Module panels include a connection means for connecting a plurality of panels in different module configurations. It is desirable to design panels that can be used over and over again for different module arrangements, and that have sufficient strength to be able to withstand the process of assembly and disassembly. It is also desirable that the panels be easily assembled for use, and easily disconnected for storage. The variety of constructions and uses for such panels is extensive. For example, panels can be arranged and connected to form walls which can be used alone for displays or privacy partitions. Multiple walls can be combined with other walls to form enclosures or a room. The walls can be formed with openings for windows and doors.

Different sized panels are used to construct different arrangements. Typical panels include detachable connection members at spaced locations along the sides of the panels for connecting panels to form a desired module assembly. Thus, it is desirable to design panels which may be selectively included as needed so as to reduce waste. It is also desirable that the panels be designed for aligning connection members of different sized panels to allow flexibility in how they are arranged or connected.

SUMMARY OF THE INVENTION

The present invention relates to an improved module panel for constructing module assemblies. The module panels are formed of a closed outer frame and a central core. The outer frame of the module panel is formed of a rigid member having an outer shell defining a hollow interior. The frame of the module panel includes spaced connector holes for inserting a connection member to connect module panels to form a module assembly. Connection members are supported relative to the frame via connector fastener members which have a connector cavity. The connector fastener members may be an insertable fastener block or formed integrally with a frame connection member.

In a preferred embodiment of the module panel of the present invention, the closed frame includes an exposed fastener block opening for inserting a fastener block aligned with one of the plurality of spaced connector holes. A means for fixing the position of the fastener block is included to secure the fastener block relative to the desired connector hole receiving the connection member. A means for securing the connection member within the connection cavity of the fastener block is also included, thus providing a generally rigid connection for the module panels to construct a module assembly. The fastener block may be inserted as desired for ease of assembly and reduced waste.

Preferably, the frame of the module panel is formed from a plurality of frame members connected via frame connection members. The frame members are hollow members formed from a relatively low-strength material. The frame connection members are formed from a solid member of a relatively high-strength material to provide structural support for the frame and module panel. Preferably, the frame connection members include first and second extensions which include a connector cavity to support connection members at the edges of the frame.

The module panels of the present invention are designed for constructing module assemblies, including different incrementally-sized module panels. The incrementally-sized module panels include coordinately spaced, pre-formed connector holes for facilitating various arrangements or configurations of interconnected panels.

DESCRIPTION OF THE DRAWINGS

FIG. 1 is a perspective view of an exemplary module assembly constructed using module panels of the present invention;

FIG. 2 is an alternate embodiment of a module assembly constructed using the module panels of the present invention;

FIG. 3A is an exploded view of a module panel of the present invention;

FIG. 3B is a partially broken-away perspective view of a frame member illustrating insertion of a fastener block and connection member;

FIG. 3C is a partially broken-away top plan view of a frame member illustrating the fastener block inserted into the hollow interior of the frame member;

FIG. 6 is a top plan view of a portion of a frame of a module panel illustrating connection of frame members via a frame connection member;

FIG. 7 is a cross sectional view of the frame member taken along line 7—7 of FIG. 6;

FIG. 8 is a top plan view of a plurality of different representative incrementally-sized panels illustrating the coordinated spacing of connector holes among these various panels; and FIG. 9 is a top plan view illustrating various representative configurations of the module panels with coordinated spaced connector holes.

DETAILED DESCRIPTION OF THE PREFERRED EMBODIMENTS

Figure 4:
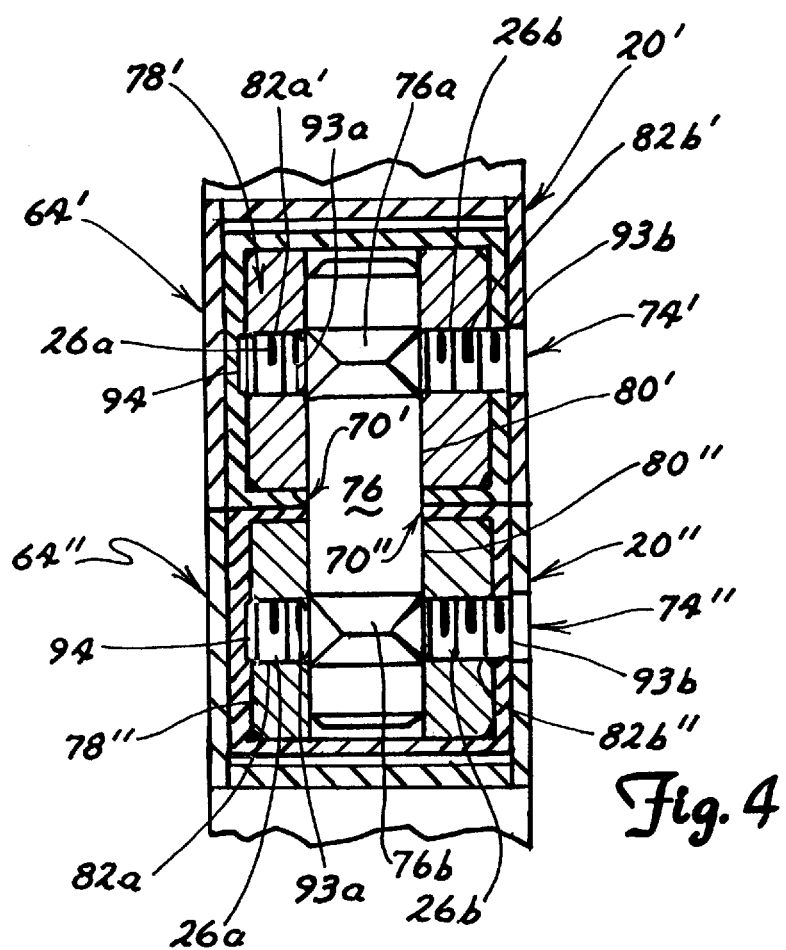
FIG. 4 is a cross sectional view of the fastened frame members of two connected module panels.

FIGS. 1 and 2 illustrate two alternate embodiments of module assemblies constructed with module panels of the present invention. The module assembly constructed in FIG. 1 is an interior room 10 formed of perpendicularly connected walls 14*a–d*. The interior room 10 includes a window 16 and door 18. Walls 14*a–d* are formed of connected module panels 20 which may be manufactured in a variety of sizes for various constructions.

As shown in FIG. 1, closed walls 14*a'* 14*c* are formed of a plurality of parallel connected wall-sized module panels 20*a*. Wall 14*b* (including window 16) is formed of connected wall-sized panels 20*a*, a header window panel 20*b*, and a sill window panel 20*c*. As shown, header window panel 20*b* is connected to a top portion of opposed wall-sized panels 20*a*.

Sill window panel 20c is connected to a lower portion of opposed wall-sized panels 20a to form wall 14b having window 16. Wall 14d is formed of wall-sized panels 20a and a door header panel 20d. As shown, the door header panel 20d is connected to opposed wall-sized panels 20a to form a continuous wall structure. Preferably, module panels 20 of walls 14a–d are perpendicularly connected via attachment posts 22 to define the interior room 10. The module panels 20 include a plurality of spaced fastener assemblies 24 for selectively connecting adjacent module panels 20 asdescribed herein.

Each module panel 20 has a predetermined number of fastener assemblies 24 extending along the perimeter of the module panel 20. For example, wall sized module panels 20a have fastener assemblies 24a–h extending along opposed sides of the module panels 20a. Depending upon the desired arrangement of the module panels 20, not all of the predetermined fastener assemblies 24 are necessary to connect a particular module panel to another module panel. For example, to connect wall sized panels 20a, it is not necessary to use each fastener assembly 24 to sufficiently connect adjacent wall sized panels 20a. In particular, it is preferred to use the minimum number of fastener assemblies 24 in order to reduce cost and assembly time.

As shown in FIG. 1, in reference to module panel 20a', spaced fastener assemblies 24a, c, f, h may be employed to connect the wall panel 20a' relative to wall sized panel 20a". However, fastener assemblies 24a, b, g, h are used to secure the wall sized panel 20b' to the header window panel 20a and sill window panel 20c. Thus, as shown for panel 20a', one side of panel 20a' uses fastener assemblies 24a, c, f, h and the other side uses fastener assemblies 24a, b, g, h. The fastener assemblies 24 employ fasteners 26 (not visible in FIG. 1).

Alternatively as shown in FIG. 2, the module panels 20 of the present invention can be used to construct a display booth 35 such as that typically used at a trade show. The module panels 20 are connected to form a tower 38, display wall 40, and a threshold overhang 42. As shown, the tower 38 is formed of a plurality of similar-sized module panels 20d and attachment posts 22. Alternate sized module panels 20e and 20f are connected as shown to form the display wall 40 and threshold overhang 42. The module assemblies 10 and 35 illustrated in FIGS. 1 and 2 are included for illustrative purposes only, and uses or configurations of the module panels 20 of the present invention are not intended to be limited to any particular module assembly 10, 35.

FIG. 3A is an exploded perspective view of the construction of the module panels 20 of the present invention. The module panel 20 of FIG. 3A is not necessarily drawn to scale. The module panel 20 includes a frame 50, a core 52, a front facing 54, a back facing 56, and front and back foam layers 58, 60. The frame 50 supports the core 52 of the module panel 20. The core 52 is positioned within the perimeter of the frame 50. In a preferred embodiment, the core 52 is formed of a honeycomb cardboard material. The core 52 is covered by the front and back facings 54, 56. The front and back foam layers 58, 60 have opposed tacky surfaces which are used to attach the front and back facing 54, 56 to the frame 50.

In particular, a first tacky surface of the foam layers 58, 60 attaches to the frame 50, and the second tacky surface of foam layers 58, 60 attaches to either the front or back facing 54, 56 to seal the core 52 of the panel 20. Preferably, the frame is formed of aluminum, and the foam layers 58 and 60 are a foam tape. The front and back facings 54 and 56 are preferably constructed of steel and the foam layers 58, 60 are sufficiently resilient to accommodate the different expansion rates between the steel facings 54, 56 and the aluminum frame 50 so that the front and back facings 54, 56 remain adhered during use and storage of the module panel 20.

The front and back facings 54, 56 may include facing fastener holes 62. In a preferred embodiment, only one of the facings 54, 56 includes a facing fastener hole 62 as described herein. Preferably, the front and back facings 54, 56 may be formed of a steel material so that an outer facing (not shown) can cover the front and back facings 54, 56. The outer facing (not shown) is also formed of a material which is magnetically attracted to the facings 54, 56. The outer facing is designed to cover the exposed facing fastener holes 62 as shown in FIG. 3A after the module assembly 10 is assembled, and may include any number of decorative patterns, graphics, or advertising material.

It is understood that there are many alternate constructions for the module panel 20. For example, it is not necessary that the module panel 20 be constructed of a honeycomb cardboard core material and covered by front and back facings 54, 56. The panel 20 may be formed of frame 50 and a clear Plexiglass® core (not shown) for providing a transparent module panel 20 for use as a window. Additionally, it is not necessary that the front and back facings 54, 56 be formed of steel and the facings 54, 56 may be formed of any number of materials such as a wood or other veneer.

The frame 50 of the module panel 20 is formed of a plurality of frame members 64. Preferably, the frame members 64 are perpendicularly connected to form a module panel 20. The frame members 64 are connected by frame connection members 66. The frame members 64 are formed of a tubular outer shell defining a hollow interior and opened ends. Pins 68 secure frame members 64 to the frame connector members 66 to provide a strong connection. The frame members 64 include a plurality of connector holes 70, a fastener block opening 72, and a plurality of frame fastener holes 74.

The connector holes 70 and fastener block openings 72 extend around an exposed outer perimeter of the frame 50, and connect the exterior of the frame members 64 to a channel defined by the hollow interior of the frame members 64. The frame fastener holes 74 are oriented perpendicularly relative to connector holes 70 and align with the facing fastener holes 62 for receiving fasteners 26. The frame fastener holes 74 extend through the outer shell of the frame members 64 to the hollow interior or channel. It is understood that the frame members 64 may be connected to form a variety of various-shaped module panels 20, and the shape of the module panel 20 is not limited to the square shape shown.

Module panels 20 are connected via connector pins 76 in cooperation with a connector fastener member 78 or connector anchor member 78. Preferably, as shown more clearly in FIG. 3B, the connector pins 76 are formed of elongated cylindrical rods and include opposed notched ends 76a, 76b for securing module panels 20 as described herein. The connector fastener member 78 may comprise a fastener block formed of solid, rigid member which is designed for insertion into the hollow interior of the frame member 64 for providing rigid support for the connector pin 76. The fastener block opening 72 of the frame members 64 as sized to allow insertion of the connector fastener member 78 therethrough for insertion into the hollow interior of the frame member 64. The connector fastener member 78 defines a connector bore 80 and preferably a pair of fastener bores 82.

As shown in FIGS. 3B and 3C, the connector bore 80 extends completely through the connector fastener member 78 and is sized similar to the connector holes 70 of the frame members 64 and the connector pins 76 so that an end of the connector pin 76 may be inserted into the connector bore 80 of the fastener block 78 for connecting module panels 20. Preferably, the fastener bores 82 of the connector fastener member 78 are aligned perpendicularly to the connector bore 80, and are sized to receive fasteners 26 for selectively securing the connector pin 76 within the connector bore 80 of the connector fastener member 78. The fastener bores 82 are internally threaded and extend from an outer surface of the connector fastener member 78 to the connector bore 80. Preferably, as shown in FIG. 3A, multiple fastener bores 82 may be included so that orientation of the connector fastener member 78 within the frame member 64 is not important. The frame members 64 may include spaced opposed frame fastener holes 74, however in the preferred construction the frame members 64 include only a single frame fastener hole 74 at each spaced location of the connector hole 70.

As shown in FIGS. 3A–3C, to attach module panels 20 via connector pins 76, the connector fastener member 78 is inserted through the fastener block opening 72 of a designated frame member 64. The connector fastener member 78 is slid along the length of the frame member 64 as indicated by arrow 86 of FIG. 3C to position the connector fastener member 78 adjacent to the connector hole 70 and frame fastener hole 74 of the frame 50 as shown in FIG. 3B. The connector fastener member 78 is inserted to align the connector bore 80 of the connector fastener member 78 with the desired connector hole 70 of the frame member 64, and thus align the fastener bores 82 of the connector fastener member 78 with a frame fastener hole 74 and facing fastener holes 62.

Preferably, the connector bore 80 and fastener block opening 72 are aligned along the width of the module panel 20, so that when the connector hole 70 of the frame member 64 is used to partially connect module panels 20, the connector holes 70 and fastener block opening 72 are hidden by the connected panels 20. Connector holes 70 and fastener block openings 72 which are not hidden may be covered by a plug member (not shown) which can be made of a flexible plastic material and designed to snap into the connector holes 70 and fastener block opening 72.

In the panel 20 shown in FIG. 3A, the pre-formed front and back facings 54, 56 include facing fastener holes 62 which may be covered by an outer facing (not shown) to hide the facing fastener holes 62. Alternatively, facing fastener holes 62 may be formed as necessary by a work tool when the module panels 20 are used to construct a module assembly 10. Individual facing fastener holes 62 may be covered or sealed by tape or adhesive material to hide the facing fastener holes 62.

As shown in FIG. 3A, support assembly 88 may be selectively secured to an exposed outer edge of the frame 50 to support the module panel 20 relative to the ground or other support surface. The support assemblies 88 include anchor pins 89 and support feet 90. The anchor pin 89 is sized for insertion into a desired connector hole 70 along an edge of the frame 50 which will support the module panel 20. A connector fastener member 78 is inserted through a fastener block opening 72, and the connector fastener member 78 is slid along the length of the frame member 64 so that the connector bore 80 of the connector fastener member 78 aligns with the desired connector hole 70 to support the anchor pin 89 for use.

The anchor pin 89 is designed similar to the connector pins 76, and includes a notched end 89a and an internally-threaded bore (not shown). The anchor pin 89 is sized for insertion of the notch end 89a into connector bore 80. The notch end 89a is secured within the connector bore 80 via fasteners 26, similar to connector pin 76. The support feet 90 each include a threaded attachment pin 91 and base 92. The attachment pin 91 is sized for insertion into an internally-threaded bore (not shown) of the anchor pin 89 to connect and secure the support feet 90 to the frame 50 of the module panel 20. The base 92 of each of the support feet 90 is shaped and sized to support the panel 20 relative to the ground or other support surface. It is noted that anchor pins 89 may be used in conjunction with a connector fastener member 78 to secure various accessories to the module panel 20, such as a light fixture, tray, or decorative accessory.

As shown in FIG. 3B, fasteners 26a, 26b are used to secure the connector fastener member 78 and connector pin 76 relative to the frame 50. FIG. 4 is a cross sectional view of connected module panels 20' and 20," and illustrates the fasteners 26a, 26b more clearly. Fastener 26a is a flat-faced fastener having a wrench socket 93a, and is a block fastener. Fastener 26b has a conical tip and a wrench socket 93b, and is a connector pin 76 fastener. Also, shown, the fastener bore 82 of the connector fastener member 78 includes first and second fastener bore sections 82a, 82b on opposed sides of the connector bore 80. The first and second fastener bore sections 82a, 82b extend between an external surface of the connector block member 78 and the connector bore 80.

As previously explained, to connect adjacent panels 20' and 20", the connector block members 78,' 78" are inserted into respective frame members 64,' 64" and aligned with the connector holes 70,' 70" as previously described. When the connector block member 78 is aligned with the desired connector hole 70 and frame fastener hole 74, block fastener 26a is inserted through the frame fastener hole 74 into the first fastener bore section 82a of the connector block member 78 to abut up against a closed side of the frame member 64, and seat into an internal recessed cavity 94 of the frame member 64 aligned with the connector hole 70 to hold the connector block member 78 in place. The length of the fastener 26a is sized so that the fastener 26a extends between the recessed cavity 94 and connector bore 80 of the connector block member 78. The length of the fastener 26a is sized small enough such that the fastener 26a does not extend into the connector bore 80, so that it does not interfere with the connector pin 76.

After the connector block members 78,' 78" are secured in corresponding frame members 64' and 64," a first notched end 76a of connector pin 76 is inserted through connector hole 70' of frame member 64' and connector bore 80' of connector block member 78,' and end 76b is inserted through connector hole 70" of frame member 64" and connector bore 80" of connector block member 78." After the ends of the connector pin 76 have been inserted into the respective frame members 64, fastener 24b is inserted into the fastener bore section 82b and tightened within the threaded fastener bore section 82b of the fastener block 78. Preferably, fastener 26b is long enough that the conical tip of the fastener 26b engages one of the notches 76a, 76b of the connector pin 76.

The notched ends 76a, 76b of the connector pins 76 are designed to align with the fastener bores 82 and frame fastener holes 74 so that when the fastener 26b is tightened, the conical tip engages the notched ends 76a, 76b of the connector pin 76 to provide a rigid connection which is able to withstand sufficient load. The interaction of the conical tip of the fastener 26b with the sloped surface of the notched ends 76a, 76b of connector pin 76 forces the connector pins 76 inwardly toward the center or core 52 of the module panel 20. The interaction of the conical tip of fastener 26b and sloped surface of the notched ends 76a, 76b of the connector pin 76 provides for a tight connection between adjoining frame members 64 so that force at the connection sites is distributed to the frame members 64 as well as the connector pins 76 and connector fastener member 78.

Thus, in the module panel 20 described, the user only needs to insert the number of connector fastener members 78 for the exact number of connector holes 70 and connector pins 76 which will be used for attaching module panels 20' and 20". For example, as shown in FIG. 1, connection of panel 20a' of wall 14b to panel 20a" of wall 14c only requires use of fastener assemblies 24a, c, f, h. However, connection of module panel 20a' to module panel 20a and panel 20c of wall 14b requires use of fastener assemblies 24a, b, g, h. Thus, fastener connector members 78 only need to be inserted where necessary, and it is not necessary that each connector hole 70 have a preassembled fastener block 78 if the connector hole 70 is not used to support a connector pin 76 or anchor pin 89.

Figure 5A:
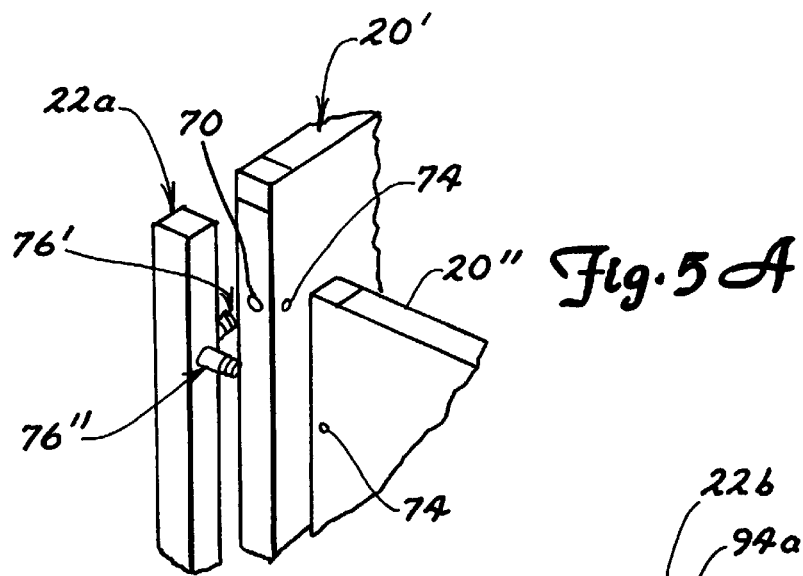
FIG. 5A is an exploded perspective view of an attachment post being used for interconnecting two module panels in an L-shaped configuration.
Figure 5B:
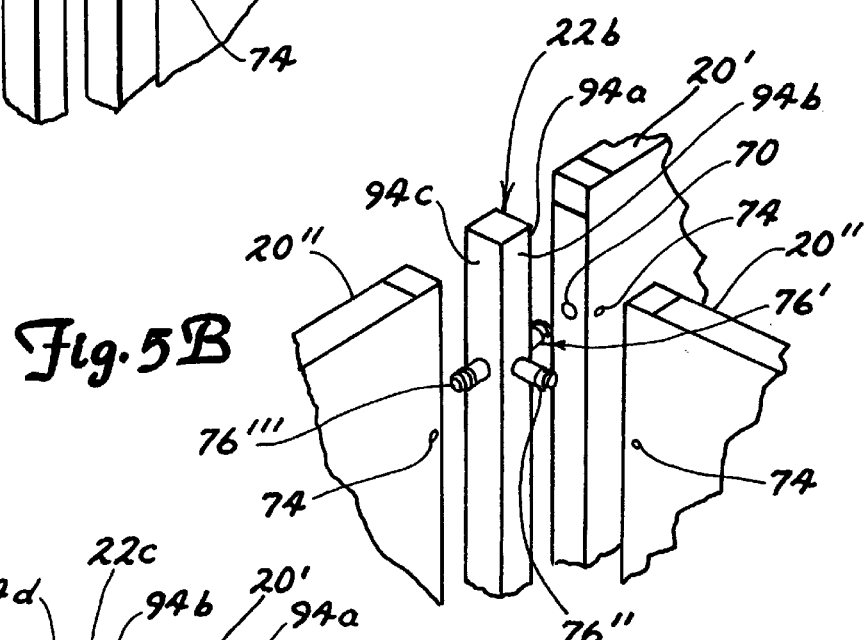
FIG. 5B is an exploded perspective view of an attachment post being used for interconnecting three module panels in a T-shaped configuration.
Figure 5C:
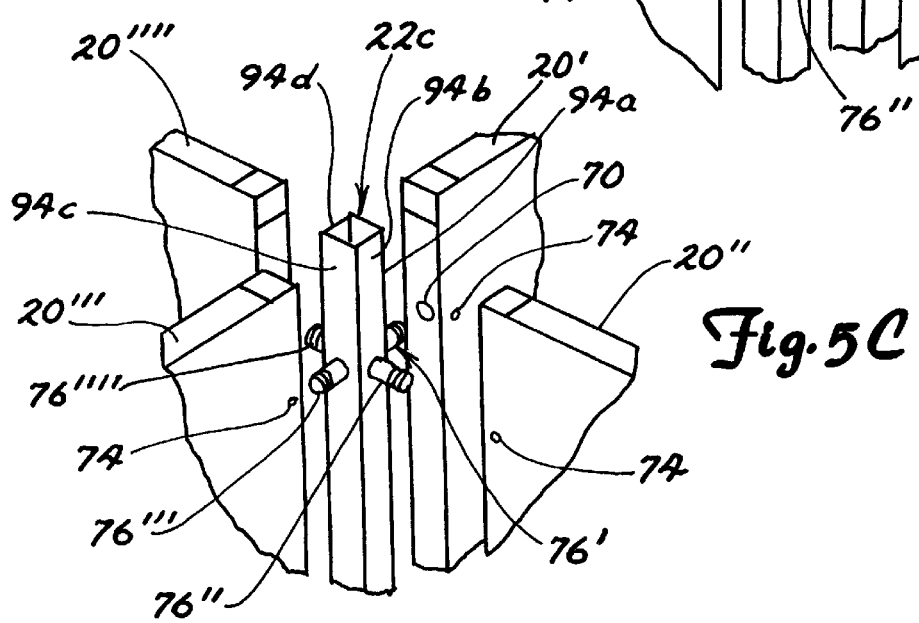
FIG. 5C is an exploded perspective view of an attachment post being used for interconnecting four module panels in a cross-shaped configuration.

Perpendicular module panels 20 are preferably attached via attachment posts 22. FIGS. 5A–5C illustrate alternate attachment post constructions 22a–c for providing a means to attach module panels 20 facilitating various module assemblies 10. The attachment posts 22 are constructed of an elongated tubular member formed from an outer shell defining a hollow interior. The corner posts 22a–c of FIGS. 5A–5C include connector pins aligned for attaching module panels 20 in a desired relation. For example, the attachment post 22a of FIG. 5A includes perpendicular connector pins 76', 76" aligned in essentially a 90° relation to one another at spaced locations to perpendicularly connect module panel 20' and panel 20".

FIG. 5B illustrates an attachment post 22b which includes at least three spaced connector pins 76', 76", 76'" for connecting panels 20', 20", 20'" in a T-shaped arrangement. As shown, the adjacent connector pins 76', 76", 76'" are aligned perpendicular to one another and extend from three sides 94a, 94b, 94c of the attachment post 22b, respectively. FIG. 5C illustrates an attachment post 22c which includes at least four connector pins 76'–76"" at spaced locations, which extend perpendicularly from sides 94a–d of the corner post 22c to perpendicularly connect four panels 20', 20", 20'", 20"". The connector pins 76'–76"" may be permanently fixed relative to the attachment posts 22a–c of FIGS. 5A–5C, or may be secured relative to the attachment posts 22a–c via cooperation of slideable fastener blocks (not shown) similar to that described for frame members 64 of the module panels 20. Alternately designed or shaped attachment posts 22 may be employed to provide various arrangements or configurations for connected module panels 20.

Alternatively, adjacent frame members 64 of adjacent module panels 20 may be directly connected in a desired perpendicular arrangement. To connect adjacent panel 20a' and panel 20a" directly, each exposed side of the frame member 64 includes a connector hole 70a–c rather than fastener holes 74. Thus, to parallelly connect adjacent panel 20a' and panel 20a", the connector hole 70b is employed. To perpendicularly connect adjacent panels 20a' and 20a", connector holes 70a or 70c of one panel 20a', 20a" is used for one end 76a of the connector pin 76 and connector hole 70b is used for the other panel 20a', 20a" for the other end 76b of the connector pin 76. Depending on the connected arrangement of the adjacent panels 20a', 20a," connector holes 70a–c of the frame members 64 may be employed as fastener holes 74.

As previously explained, the frame members 64 are connected by frame connection members 66 to form a closed frame 50 wherein the hollow interior of the frame members 64 are closed by the frame connection members 66. FIG. 6 is a view of a portion of the frame 50 illustrating perpendicularly-connected frame members 64a, 64b to form a rectangular-shaped module panel 20. The frame connection member 66 is formed of a solid member of heavy metal to provide strength and support and to prevent damage to the module panel 20 if dropped during use. The frame connection member 66 shown includes an anchor portion 96, first extension 98, second extension 100, connector bore 80' (similar to connector bore 80 of the fastener connector member 78), and threaded fastener bore 82' (similar to the fastener bore 82 of the fastener connector member 78). In the embodiment shown, the first and second extensions 98, 100 extend from the anchor portion 96 in a 90°0 relation to form a corner for a rectangular-shaped module panel 20. The first and second extensions 98, 100 are sized smaller than the outer shell of the frame members 64.

Ends of the frame members 64 are opened, and the extensions 98, 100 are inserted through the open ends into the hollow interior of the frame members 64a, 64b. As previously explained, the frame members 64 are preferably formed of a light weight material such as aluminum. Thus, the frame connection members 66 provide sufficient strength and support for a frame 50 constructed of the frame members 64 and frame connection members 66.

Connector bores 80' are formed through the extensions 98, 100 of the frame connection member 66, and are orientated for alignment with connector holes 70 of the frame members 64 for insertion of a connector pin 76 to secure module panels 20 proximate to the edges of the frame members 64. Thus, extensions 98, 100 including connector bores 80' function as the connector fastener members 78 at the edges of the frame members 64. The rigid construction of the frame connection members 66 provides sufficient support for the connector pin 76 similar to the insertable connector fastener member 78. Thus, since the connector bore 80' for supporting the connector pin 76 at the edges of the frame members 64 is formed integrally with the extension 98, 100 of the frame connection member 66 as described, the force applied to the connector pins 76 inserted into the connector bores 80' for securing multiple panels 20, reinforces the connection of the frame connection member 66 to the frame members 64 for connected panels 20 of a module assembly 10.

The threaded fastener bore 82' extends through extensions 98, 100 and is orientated perpendicular to the connector bore 80' for alignment with frame fastener holes 74. When the extension 98, 100 are inserted into the open ends of the frame members 64, the threaded fastener bores 82' of the extension 98, 100 align with a frame fastener hole 74 of the frame member 64 (similar to the alignment of fastener bore 82 of connector fastener member 78 with fastener holes 74 of the frame members 64) for insertion of fasteners 26 to lock connector pins 76 within connector bore 80' to secure module panels 20.

In embodiments of a module panel 20 discussed above, the connector fastener member 78 was inserted into the open ends of unassembled frame members 64. The connector fastener members 78 were secured relative to the frame members 64 via fasteners 26 inserted into frame fastener holes 74. After all of the necessary connector fastener members 78 are inserted into a frame member 64 for alignment with each connector hole 70 of the frame member 64, the frame connection members 66 are used to secure adjacent frame members 64 by inserting first and second extensions 98, 100 into the open ends of the frame members 64. Insertion of the first and second extensions 98, 100 into the open ends of the frame members 64 thus closes these ends of the frame members 64.

Prior art frame members 64 did not include fastener block openings 72, and thus it was necessary that the connector fastener members 78 be inserted into the frame members 64 prior to connection of the frame connection members 66 to construct a completed module panel 20. Thus, it was necessary for a connector fastener member 78 to be inserted for each possible connector hole 70 (without regard to whether the connector hole 70 was to be used), since it was not possible to insert a connector fastener member 78 into an assembled module panel 20. Thus, the construction of the module panel 20 of the present invention including the fastener block opening 72 along the frame members 64 allows for selective insertion of connector fastener members 78 depending upon whether a particular connector hole 70 will be used to connect module panels 20.

FIG. 8 is a cross sectional view of pin 68 for securing the extensions 98, 100 of frame connection members 66 relative to the frame member 64a as taken along line 7—7 of FIG. 6. As shown, the pin 68 includes a first pin 68a and a second pin 68b. The first and second pins 68a, 68b are formed of cylindrical tubular members having tapered ends 106a, 106b. The extensions 98, 100 define a pin bore 108. The hollow shell of the frame members 64 includes upper and lower pin holes 110, 112. As shown in FIGS. 7–8, the frame members 64a, 64b are secured relative to the frame connection member 66 by inserting the upper pin 68a through upper pin hole 110 of the frame member 64, and through pin bore 108 of the frame connection member 66. The lower pin 68b is inserted through lower pin hole 112 of the frame member 64, and through pin bore 108 of the frame connection member 66. The pins 68a, 68b are sized similar to the pin bore 108 to provide a tight frictional fit to securely fasten the frame members 64a, 64b relative to the frame connection member 66. The tapered ends 106a, 106b facilitate insertion of the pins 68a, 68b through the pin bore 108. Thus, frame members 64 are securely fastened via frame connection members 66 and pins 68a, 68b.

As previously explained, the module panels 20 of the present invention are made in various sizes for constructing different module assemblies 10. Preferably, a collection of standard sized module panels 20 are provided with standard spaced connector holes 70 for constructing varied module assemblies 10 as depicted in FIGS. 1 and 2. FIG. 9 illustrates an embodiment of a collection of incrementally-sized panels 20 with coordinately spaced connection holes 70. Preferably the collection of incrementally-sized module panels 20 are formed of incrementally-dimensional frame members 64 where each incremental size is twice the length of a smaller sized frame member 64. The incrementally-sized frame members 64 are connected to form incrementally-sized frames 50 of the module panels 20.

FIG. 9 illustrates a collection of incremental length panels 120a–d. All of the panels shown have the same incremental width, however it is noted that the incremental widths can be varied as well as the incremental lengths of the panels 120. Panel 120a shown is the largest in length. Panel 120b is half the length of panel 120a. Panel 120c is half the length of panel 120b, and panel 120d is half the length of panel 120c. Preferably, panel 120a is 92 inches, panel 120b is 46 inches, panels 120c is 23 inches, and panel 120d is 11½ inches in length. Although four different incremental length panels 120a–b are described, it should be understood that the invention is not limited to the incremental length panels 120a–d shown. Panels 120a–d may also be formed of varied incremental widths similar to that described for the incremental lengths.

The incrementally-sized panels 120a–d include coordinately spaced connector holes 70 for securing connector members 76. Each of the frame members 64 includes a plurality of equally-spaced connector holes 70. Thus, each connector hole 70 is spaced the same distance from the edge of every panel 120a–d, and spaced the same distance from the other connector holes 70. Preferably, a 92 inch frame member 64 includes sixteen equally-spaced connector holes 70. The next incrementally-sized frame member 64 of 46 inches includes eight equally-spaced connector holes 70. The next incrementally-sized frame member 64 of 23 inches includes four equally-spaced connector holes 70, and the next incrementally-sized frame member 64 of 11½ inches includes two equally-spaced connector holes 70.

The coordinated connector hole 70 spacing for the incrementally sized frame members 64 provides an interchangeable system of panels 120 which can be assembled in various arrangements as shown diagramatically in FIG. 10. The collection of incrementally-sized frame members 64 and panels 120 described provides a more flexible system than prior panel systems because of the coordinated spacing between connector holes 70 for panels 120a–d of different sizes. The coordinated spacing for the connector holes 70 is accomplished by incorporating connector bore 80' through the extensions 98, 100 of the frame connection members 66, so that the connector holes 70 may be equally spaced along the entire length of the frame members 64.

While the invention has been described with respect to a preferred embodiment, it is not intended that the invention be limited to the embodiments shown. Workers skilled in the art will recognize that changes may be made in form and detail without departing from the spirit and scope of the invention.

What is claimed is:

1. In combination:

a module panel including a frame and a central core, the frame being formed of a generally rigid member having a substantially closed outer shell defining an interior region, a connector hole communicating with the interior region, and an anchor opening communicating with the interior region;

a connector member having an end configured for insertion through the connector hole of the frame and an exposed end;

a connector anchor member for supporting the end of the connector member within the hollow interior of the frame, the connector anchor member defining a connector cavity sized to receive the end of the connector member therein the anchor opening positioned along the outer surface of the frame generally proximate to the connector hole and sized so as to receive the connector anchor member therethrough into the interior region of the frame such that the connector anchor member is moved within the interior region of the frame to align the connector cavity with the connector hole;

a first fastener element selectively securing the connector anchor member in position with the connector cavity generally aligned relative to the connector hole; and a second fastener element selectively securing the end of the connector member within the connector cavity of the connector anchor member, the exposed end of the connector member for selectively connecting the module panel to a like module panel.

2. The combination of claim 1 wherein the connector member is an elongated cylindrical rod and the connector cavity of the connector anchor member is a cylindrical bore.

3. The combination of claim 1 wherein the first fastener element selectively securing the end of a connector member within the connector cavity of the connector anchor member includes a threaded fastener extending though a fastener hole defined by the frame and received within a fastener bore defined by the connector anchor member, the fastener bore intersecting the connector cavity, the fastener bore and the fastener hole being sized for insertion of the fastener and oriented relative to the connector cavity so that the fastener may be is inserted through the fastener hole and fastener bore to engage the end of the connection member and retain the connector member within the connector anchor member.

4. The combination of claim 3 wherein the end of the connector member defines a notch and the fastener has a conical tip to engage the notch.

5. The combination of claim 3 wherein the fastener bore is aligned generally perpendicular to the connector cavity of the connector anchor member inserted into the interior region of the frame.

6. The combination of claim 3 wherein the fastener bore extends between a pair of opposed outer surfaces of the connector anchor member in alignment with the connector cavity so as to define a first fastener bore section and a second fastener bore section, and wherein the second fastener element selectively securing the connector anchor member relative to the connector hole includes an anchor fastener having a length sized such that a portion of the anchor fastener is aligned with and received within one of the first fastener bore section or the second fastener bore section.

7. The combination of claim 6 wherein the block fastener is a threaded and defines a wrench socket.

8. In combination:
a module panel having a frame and a core portion, the frame including a plurality of frame members and a plurality of frame connection members, each of the plurality of frame members being formed of an outer shell defining an interior channel and having open ends each of the plurality of frame connection members including a first extension and a second extension designed for insertion into the open ends of two of the plurality of frame members for connecting adjacent ones of the plurality of frame members to define a closed frame, the first extension and the second extension each defining a connector cavity extending therethrough, each of the plurality of frame members defining a plurality of connector holes, each of the plurality of connector holes extending through the outer shell of the frame members and aligned with the connector cavity of either the first extension or the second extension received within the corresponding ones of the open ends of the frame members;
a plurality of connector members each having an end and an exposed portion, the end sized for insertion through one of the plurality of connector holes of the frame members and received within the connector cavities; and
a first fastener element selectively securing the end of the connector member within the connector cavity, the exposed portion of the connector member permitting the module panel to be connected to a like module panel.

9. The combination of claim 8 wherein each of the plurality of frame members define a plurality of connector holes spaced along an extent thereof in addition to the connector holes disposed proximate to the open ends of the plurality of frame members and aligned with the connector cavity of the first extension or the second extension inserted therein, the frame members further defining a plurality of anchor openings each disposed generally proxmate to one of the connector holes spaced along the extent of each of the plurality of frame members and communicating with the interior channel, the combination further comprising:
a plurality of connector anchor members each for supporting one of the plurality of connector members, each of said plurality of connector anchor members being inserted through a one of the plurality of anchor openings into the interior region of one of the plurality of frame members, each connector anchor member defining a connector cavity receiving the end of one of the plurality of connection members therein; and
a second fastener element selectively securing the connector anchor member relative to and generally aligned with a corresponding one of the plurality of connector holes.

10. The combination of claim 8 wherein the first extension and the second extension of each of the frame connection members each include a pin cavity, and the plurality of frame members each define a pair of pin holes proximate to the open ends thereof, the pin cavity of each of the first extension and the second extension of the frame connection members being aligned with a corresponding one of the pair of pin holes when the extension and the second extension are inserted into the open ends of the plurality of frame members, and further including a plurality of pins, each of the plurality of pins being received within a corresponding one of the pair of pin holes and the pin cavity for fastening the plurality of frame members to the plurality of frame connection members.

11. The combination of claim 8 wherein the first extension and the second extension are perpendicularly aligned for perpendicularly connecting adjacent frame members.

12. The combination of claim 10 wherein the plurality of pins are each tapered for insertion into the pin cavity.

13. The combination of claim 8 wherein the first extension and the second extension each define a fastener bore generally intersecting the connector cavity proximate thereto and sized for receiving fastener therein selectively engaging the end of the corresponding one of the plurality of connector members.

14. The combination of claim 8 wherein each of the plurality of frame members is aluminum.

15. The combination of claim 8 wherein each of the plurality of frame connection members is a high strength material.

16. The combination of claim 8 wherein the core portion of the module panel is a honeycomb cardboard material.

17. The combination of claim 8 including a first facing and a second facing covering the core portion of the module panel, the first facing and the second facing being formed of a magnetic material.

18. The combination of claim 17 including a first foam layer and a second foam layer having opposed tacky surfaces for adhering the first facing and the second facing to the plurality of frame members, one of the opposed tacky surfaces being adhered to a one of the plurality of frame members and another of the opposed tacky surfaces being adhered to the first facing and the second facing, respectively, the first foam layer and the second foam layer allowing relative movement between the corresponding one of the plurality of frame members and the first facing and the second facing.

19. A module panel construction assembly comprising:

a plurality of incrementally-sized module panels, each of the plurality of incrementally-sized module panels including a frame formed of a plurality of generally rigid frame members, each of the plurality of generally rigid frame members having an outer shell defining an interior region, the plurality of generally rigid frame members each defining a plurality of connector holes coordinatingly spaced along an extent of the plurality of frame members, the plurality of connector holes sized to receive a connector member for connecting two of the incrementally-sized module panels, the plurality of connector holes being spaced such that the distance between adjacent ones of the plurality of connector holes is generally the same for each of the plurality of frame members of each of the plurality of incrementally-sized module panels permitting any of the plurality of incrementally-sized module panels to be interconnected with one another.

20. A module panel for use with a plurality of connector members and a plurality of connector anchor members, said module panel comprising: an outer frame and a central core, the outer frame being formed of a closed outer shell having a perimeter and defining an interior region, the frame defining a plurality of connector holes disposed at spaced locations around the perimeter of the frame, the connector holes extending through the outer shell of the frame and communicating with the interior region, the plurality of connector holes each being sized so as to receive one of the plurality of connector members therethrough, the frame further defining a plurality of anchor openings each disposed generally proximate to one of the plurality of connector holes and communicating with the interior region, each of the plurality of anchor openings being sized to receive a one of the plurality of connector anchor members therethrough into the interior region and permitting the one of the plurality of connector anchor members to be moved into alignment with the one of the connector holes for supporting a corresponding one of the plurality of connector members.

21. The module panel of claim 20 wherein the central core is a honeycomb cardboard material.

22. The module panel of claim 20 wherein the central core is translucent.

\* \* \* \* \*